A. V. HANNIFIN.
PNEUMATICALLY OPERATED CLUTCH.
APPLICATION FILED APR. 12, 1910.

984,426.

Patented Feb. 14, 1911.

Witnesses:
Ephraim Banning.
Mary R. Frost.

Inventor:
Arthur V. Hannifin.
BY 
Attorneys.

UNITED STATES PATENT OFFICE.

ARTHUR V. HANNIFIN, OF CHICAGO, ILLINOIS.

PNEUMATICALLY-OPERATED CLUTCH.

984,426. Specification of Letters Patent. Patented Feb. 14, 1911.

Application filed April 12, 1910. Serial No. 555,009.

*To all whom it may concern:*

Be it known that I, ARTHUR V. HANNIFIN, a citizen of the United States, residing at Chicago, in the county of Cook and State of Illinois, have invented certain new and useful Improvements in Pneumatically-Operated Clutches, of which the following is a specification.

The present invention relates to a method of employing compressed air or other similar medium to operate clutch mechanism for instantly reversing the direction of drive of a driven shaft.

The object of the present invention is to construct independent piston chambers, which will be located intermediate the pulleys, and which will contain pistons adapted, when actuated, to throw either one of the pulleys desired into clutch with a clutch member carried by the driven shaft.

Another object of the invention is to form independent passages through the driven shaft, for conducting the medium to the piston chambers, and to arrange said passages so that but one bore is necessitated in the driven shaft.

Further objects will appear from a detailed description of the invention, which consists in the features of construction and combination of parts hereinafter described and claimed.

Figure 1:
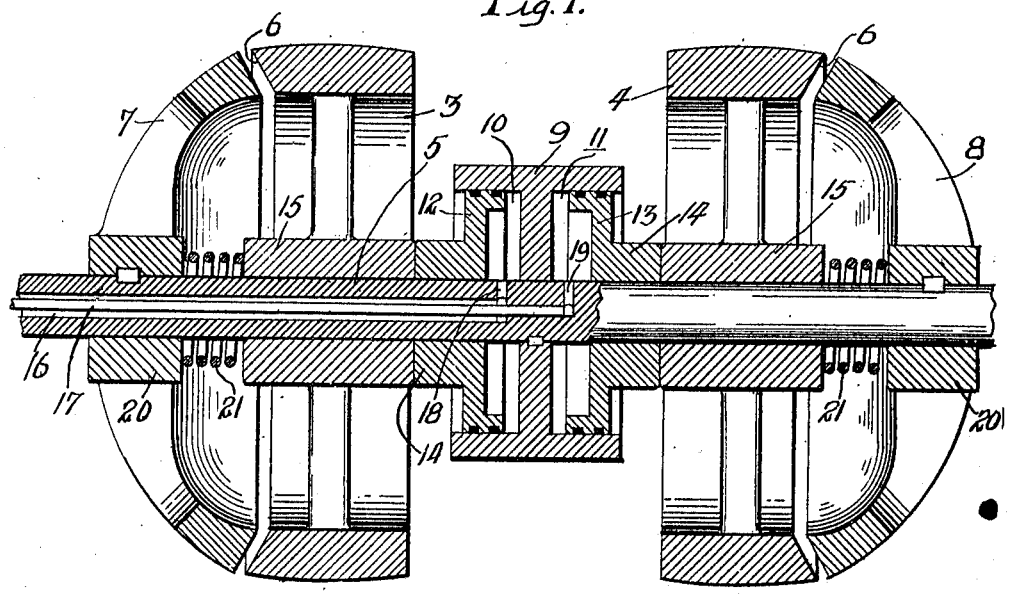
Figure 2:
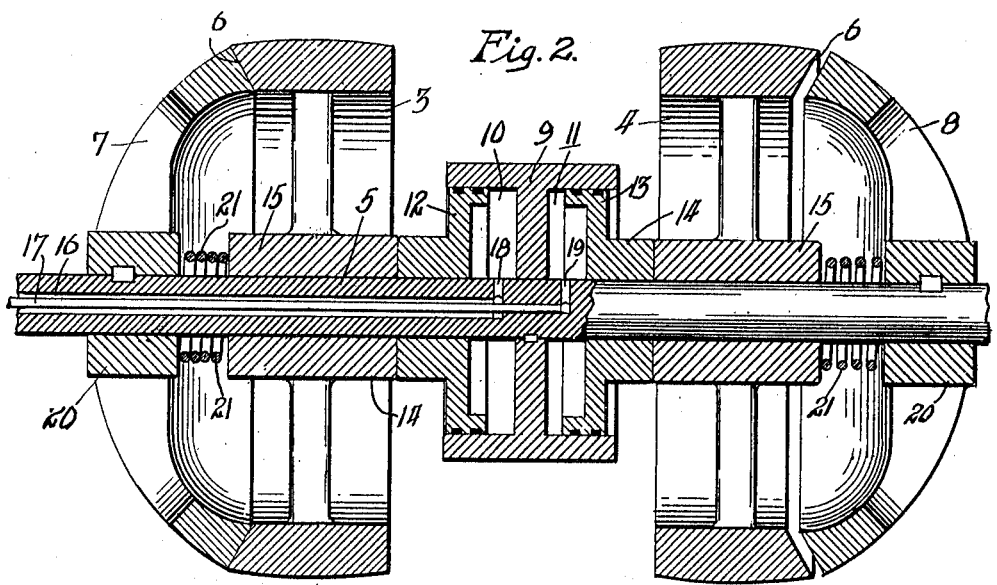
Figure 2:
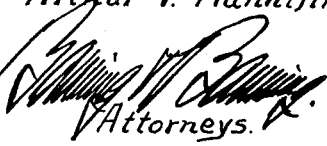

In the drawings, Figure 1 is a sectional elevation, showing both of the pulleys in unclutched position; and Fig. 2 is a similar view, showing one of the pulleys in clutch with a clutch member carried by the driven shaft.

The mechanism is employed in connection with pulleys indicated by the numerals 3 and 4. These pulleys may be of any ordinary and well known type, and, as usual in such constructions, carry belts depending from the main drive shaft, one of the belts being twisted so as to give to one of the pulleys a reverse direction of movement from the other.

The construction and arrangement of the belting and the main driving shaft are so well known to any one skilled in the art that detailed description and illustration thereof are deemed unnecessary, since they form no part of the present invention.

The pulleys 3 and 4 are loosely mounted upon a driven shaft 5, and each of the pulleys is provided with a clutch face 6, which is adapted to co-act with a clutch face upon clutch members 7 and 8, keyed or otherwise secured to the driven shaft. Located intermediate the pulleys 3 and 4, and preferably keyed to the driven shaft, is a cylinder 9, having formed therein oppositely disposed piston chambers 10 and 11, in which operate pistons 12 and 13 of any suitable or well known type. As shown, the pistons are formed with piston stems 14, which normally abut against a hub 15 formed on the pulleys, and a constant contact is thus effected between the pistons and the pulleys, so that movement of either one will impart movement to the other. Extending longitudinally through the driven shaft 5 is a passage or bore 16, into which is entered a pipe 17 of reduced diameter thereto. The pipe 17 extends to a point beyond the terminus of the bore, and cross passages 18 and 19 are formed in the shaft, the passage 18 communicating with the bore 16 and the piston chamber 10, and the passage 19 communicating with the pipe 17 and the piston chamber 11, the passage 16 and the cross passage 18 serving to conduct a medium to the chamber 10, and the pipe 17 and the cross passage 19 serving to conduct a medium to the chamber 11; and, as will be seen, these passages are entirely independent of one another and establish a separate source of communication to each piston chamber, and at the same time they are so constructed and arranged that only one longitudinally extending bore through the shaft is necessitated. This construction enables the device to be more cheaply manufactured, and at the same time does not necessitate a cutting away of the shaft to an extent that would tend to weaken its strength. The fixed clutch members 7 and 8 are each provided with a hub 20, and interposed between the hubs 20 and the hubs 15 of the pulleys 3 and 4 are coil springs 21, which act to return the pulleys and pistons to normal position after pressure has been cut off from the piston chamber.

The operation is as follows: Referring to Fig. 2, when pressure is admitted to the piston chamber 10, the piston 12 will be actuated to force the clutch face 6 of the pulley 3 into engagement with the clutch face of the fixed clutch member 7. The two sections will be thus locked together, and the driven shaft 5 will be rotated by the rotation of the pulley 3. In case it is desired to reverse the direction of drive of the shaft 5, the pressure will be cut off from the chamber 10 and applied to the chamber 11. The spring will act to force the pulley 3 out of engagement with the fixed clutch member 7, and the pressure will actuate the piston 13 to throw the pulley 4 into engagement with the fixed clutch member 8, and the shaft will then be rotated by the movements of the pulley 4, which will be in a reverse direction to the movements of the pulley 3. As shown, the cylinder 9 is keyed to the shaft 5, which is necessary because of the fact that if movement of this cylinder were possible the medium would not operate to force the piston in the manner desired.

I claim:

1. In a device of the class described, the combination of a driven shaft, clutch members fixedly secured to said shaft, pulleys loosely mounted upon said shaft and provided with clutch faces, fixed cylinders located intermediate the pulleys, independent pistons within the cylinders, said shaft having extending longitudinally therethrough independent means for conveying a medium under pressure to the cylinders, and a direct connection between each piston and a pulley, whereby the actuation of a piston will throw a pulley into clutch with the fixed clutch member with which it co-acts and rotate the driven shaft in the desired direction, the actuation of either piston being independent of the other, whereby the throwing in of one clutch connection imparts no movement to the other, and means for returning the pistons and pulleys to normal position, substantially as described.

2. In a device of the class described, the combination of a driven shaft, clutch members fixedly secured to said shaft, pulleys loosely mounted upon said shaft and provided with clutch faces, a double-chambered cylinder rigidly held between the two pulleys, a piston within each chamber, means for conveying a medium under pressure to said chambers, and a direct connection between each piston and a pulley, whereby the actuation of a piston will throw a pulley into clutch with the fixed clutch member with which it co-acts and rotate the driven shaft in the desired direction, each piston operating independently of the other, whereby the throwing in of one clutch connection imparts no movement to the other, and means for returning the pistons and pulleys to normal position, substantially as described.

3. In a device of the class described, the combination of a driven shaft, clutch members fixedly secured to said shaft, pulleys loosely mounted upon said shaft and provided with clutch faces, a double-chambered cylinder mounted upon said shaft and held against sliding movement with respect thereto, said cylinder being located intermediate the two pulleys, a piston within each chamber, means for conveying a medium under pressure to said chambers, and a direct connection between each piston and a pulley, whereby the actuation of a piston will throw a pulley into clutch with the fixed clutch member with which it co-acts and rotate the driven shaft in the desired direction, each piston actuating independently of the other, whereby the throwing in of one clutch mechanism imparts no movement to the other, and means for returning the pistons and pulleys to normal position, substantially as described.

4. In a device of the class described, the combination of a driven shaft, clutch members fixedly secured to said shaft, pulleys loosely mounted upon said shaft and provided with clutch faces, a double-chambered cylinder rigidly held between the two pulleys, a piston within each chamber, said shaft having longitudinally extending therethrough independent means for conveying a medium under pressure to the cylinders, and a direct connection between each piston and a pulley, whereby the actuation of a piston will throw a pulley into clutch with the fixed clutch member with which it co-acts and rotate the driven shaft in the desired direction, each piston actuating independently of the other, whereby the throwing in of one clutch member imparts no movement to the other, and means for returning the pistons and pulleys to normal position, substantially as described.

ARTHUR V. HANNIFIN.

Witnesses:
WALKER BANNING,
FRANCES M. FROST.